United States Patent [19]
Powell

[11] 4,040,239
[45] Aug. 9, 1977

[54] PROTECTIVE HEADGEAR FOR HORSES

[75] Inventor: Kenneth W. Powell, Sweetwater, Tex.

[73] Assignee: Charles G. Powell, Sweetwater, Tex.; a part interest

[21] Appl. No.: 674,663

[22] Filed: Apr. 6, 1976

[51] Int. Cl.² .............................................. B68C 5/00
[52] U.S. Cl. ........................................ 54/80; 119/142
[58] Field of Search ................ 54/80, 81, 2; 119/143, 119/142, 104

[56] References Cited

U.S. PATENT DOCUMENTS

| 669,909 | 3/1901 | Young | 119/143 |
| 2,871,642 | 2/1959 | Damone | 54/80 |

FOREIGN PATENT DOCUMENTS

| 10,388 of | 1912 | United Kingdom | 54/80 |
| 26,231 of | 1912 | United Kingdom | 54/80 |
| 17,524 of | 1909 | United Kingdom | 54/80 |

Primary Examiner—Louis G. Mancene
Assistant Examiner—Peter K. Skiff
Attorney, Agent, or Firm—Clarence A. O'Brien; Harvey B. Jacobson

[57] ABSTRACT

Protective headgear for horses which comprises a protective padded face mask with extra safety features including a reinforced eye rim and blinker cup and a protective flap for the poll of the head.

8 Claims, 4 Drawing Figures

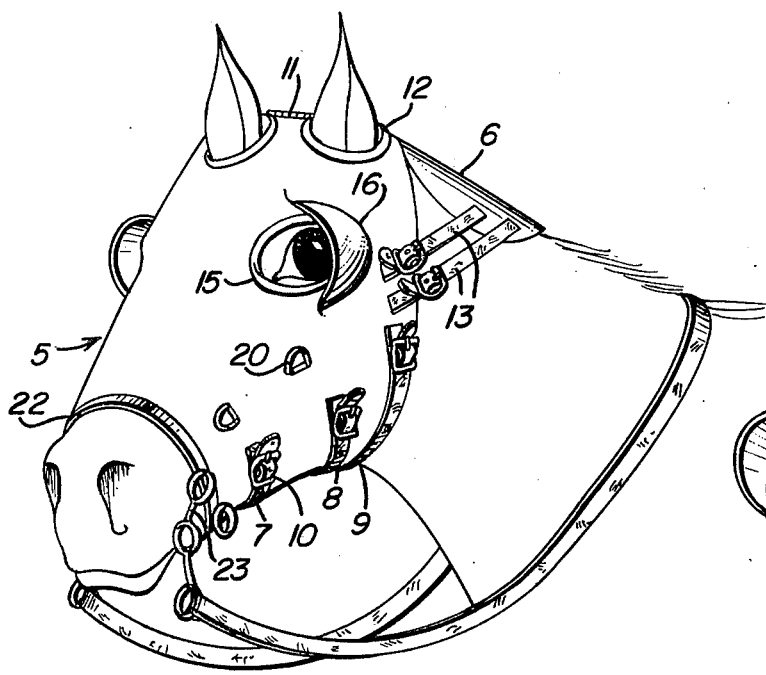
Fig. 1
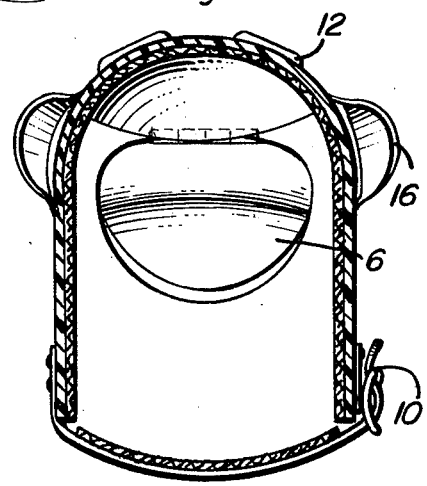
Fig. 3
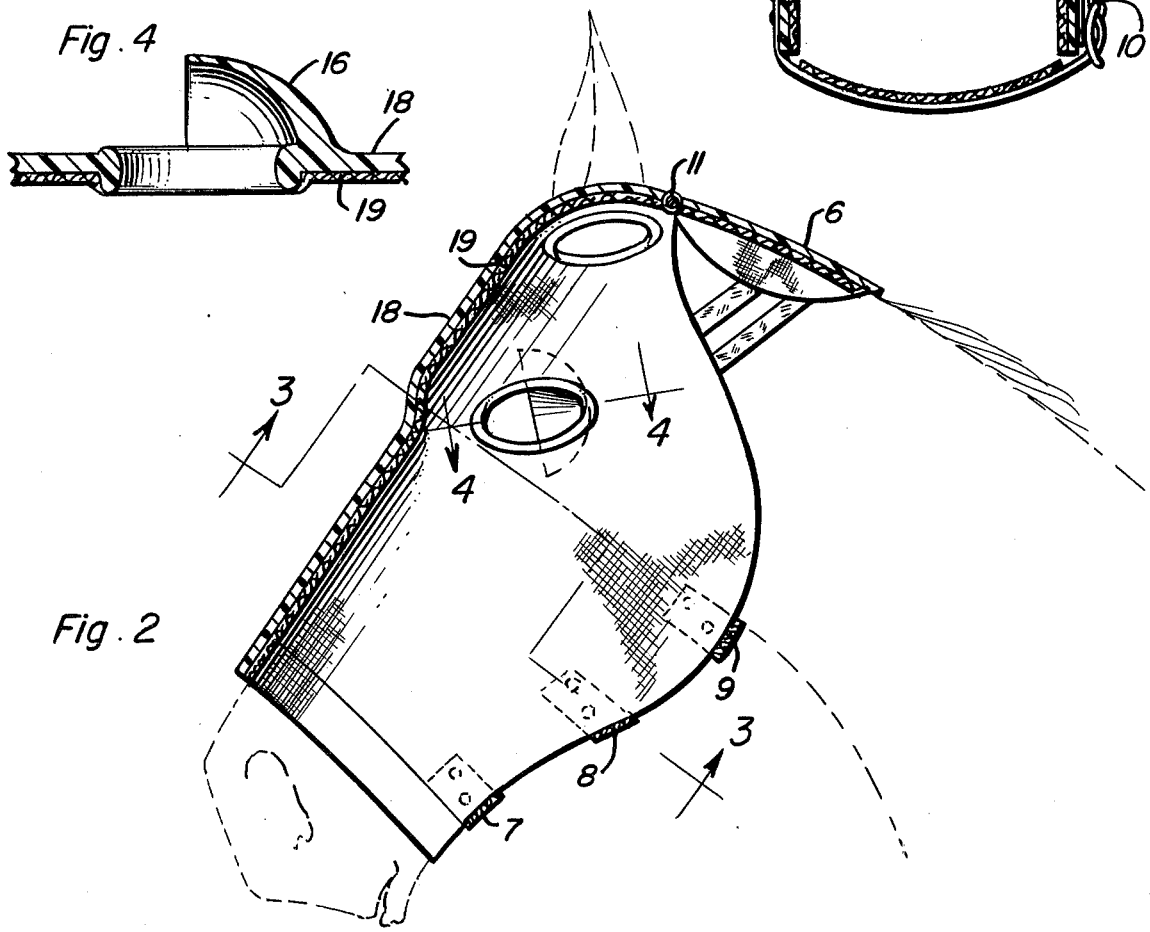
Fig. 4
Fig. 2

PROTECTIVE HEADGEAR FOR HORSES

BACKGROUND OF THE INVENTION

1. Field of the Invention

Horses being halter trained and those horses being trained for racing will sometimes rear back and fall. A horse which is in the starting gate can fall over, hit his head or damage his eyes on the starting gate.

2. Description of the Prior Art

Hoods and blinders for horses and cattle to be used in case of fire have been devised, such as Ferris, U.S. Pat. No. 69,199 and Sullivan, U.S. Pat. No. 382,668. The U.S. Pat. No. 1,102,570, to Callahan, recognizes that sick and weak horses lying on the stable floor will continually raise their head and then drop them on the floor severely damaging themselves, and Callahan has provided a cushion device for the horse to protect him in this circumstance.

SUMMARY OF THE INVENTION

The present invention relates to a device used when halter training horses and training horses coming out of starting gates. Many horses startle, rear up, fall over backwards at the staring gate and the protective headgear about to be described will prevent injury in this circumstance. The protective headgear will be comfortable for the horse to wear, will not interfere with the horse's riding and will effectively prevent damage to the horse.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a view of the horse wearing the protective headgear.

FIG. 2 is a longitudinal section of the device.

FIG. 3 is a sectional view taken on line 3—3 of FIG. 2 looking upwardly.

FIG. 4 is a cross-sectional view taken on line 4—4 of FIG. 2 and showing the reinforced eye rim and cup.

DETAILED DESCRIPTION OF THE INVENTION

In FIG. 1 of the drawings, a face mask generally designated as 5 is shown, which extends in length from above the ears of the horse down to just above the nostrils tapering to conform to the configuration of the horse's head. The sidewise extent of the face mask 5 reaches from side to side to cover the upper face and side completely and is held in place by a series of jaw straps 7, 8 and 9, which are attached as by adjustable buckles 10 beneath the horse's head to secure it thereto. A second protective member 6 which protects the poll and neck of the horse is hinged to the face mask 5, as at 11. This hinging allows the animal the flexibility to change the position of its head. The hinge 11 must be smooth inside and out for comfort and safety, and lie in the plane of the elements it connects, namely, face mask 5 and protective member 6. The configuration of the latter is generally curved and has a greater lateral extent than longitudinal. Buckles and straps 13 provide a second means, beyond the hinge to attach protective member 6 to face mask 5. The spaced ear holes 12 have reinforced or beaded rims. Eye openings 15, one at each side of the helmet, also have a reinforced beaded edge, as clearly shown in FIG. 4. Blinkers 16 cup shaped are secured to the outer edge of the eye openings. The blinkers may be optionally of ¼, ½ or ¾ cup size. These form eye socket shields which extend one inch above the eye opening at its central point and taper down to nothing at the top and bottom of the eye opening.

The protective headgear may be made of a variety of materials, among them leather, fiberglass, Marbon Cycolac GSM or polyethylene plastic, perforated for ventilation, lined and padded at stress points with foam rubber or sheepskin. The outer surface is indicated by numeral 18 and the lining by numeral 19.

Snaps 20 are provided at each side beneath the eye openings so that a racing shadow roll may be installed. Further, a halter is built into the face helmet as shown at 22, and is made of lightweight nylon. In FIG. 1, a lightweight strap 23 is secured at each side of the bottom of the mask just above the mouth of the horse for the reception of bits and reins to eliminate the need for a head stall. The protective devices can be made in a range of sizes to accommodate one month old colts as well as older horses.

The foregoing is considered as illustrative of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Protective headgear for horses comprising: means for substantially covering the complete head of a horse except for the ears, eyes, mouth and nose portions, including; a face mask of configuration to substantially conform to the head of a horse, the face mask as viewed from the side having a slightly convexly curved upper edge, a narrow lower edge and side edges converging from the top to the bottom edge, a pair of spaced openings near the top edge and spaced on each side thereof to receive the ears of the horse, a pair of farther apart spaced eye openings, one at each side of the face mask to accommodate the eyes of the horse, eye blinder cups secured to the outer edge of the eye openings, a protective flap member for the poll and neck of the horse hinged to the face mask at its upper rear edge, both the face mask and the protective flap member being lined with a soft protective padding, means for securing the face mask beneath the jaw of the horse, and further means for adjustably securing the side edges of the protective flap member to the rear side edges of the face mask.

2. Protective headgear as in claim 1, wherein the eye and ear openings have a reinforced beaded rim.

3. Protective headgear as in claim 1, wherein the means for securing the face mask beneath the jaw of the horse comprises a series of three spaced adjustable straps and buckles to allow the face mask to be tightly conformed to the shape of the head of the horse on which it is used.

4. Protective headgear as in claim 1, wherein a halter is incorporated in the face mask structure.

5. Protective headgear as in claim 1, wherein the eye openings are generally circular and the cups extend at least ¼ way over the eye openings.

6. Protective headgear as in claim 1, in which adjustable straps are secured at each side of the lower edge of the face mask to receive bits and reins.

7. Protective headgear as in claim 1, wherein the face mask is provided at each side beneath the eye openings with snap means to receive a shadow roll.

8. Protective headgear as in claim 1, wherein the protective flap member is generally elliptical in configuration.

* * * * *